Figure 1:
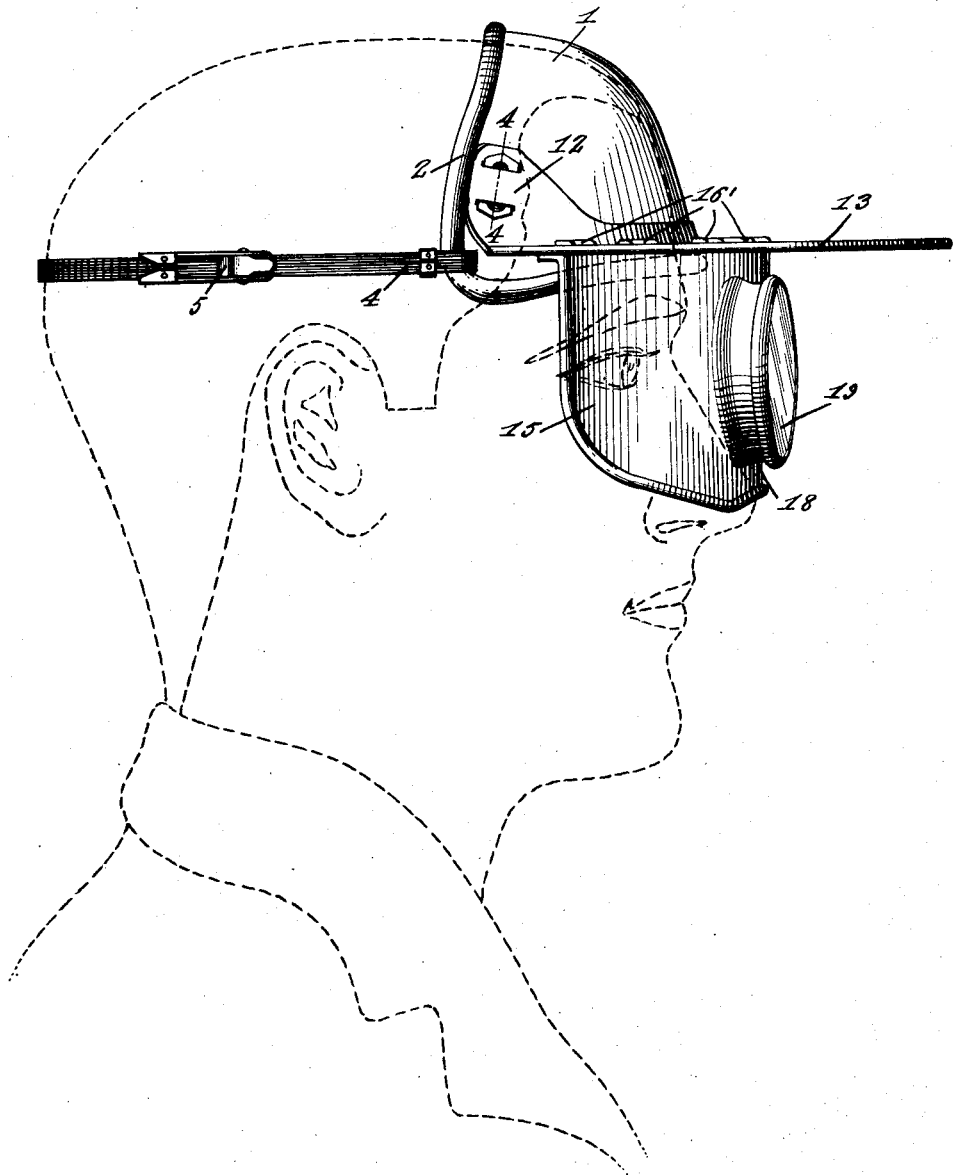

Patented July 2, 1929.

1,719,705

UNITED STATES PATENT OFFICE.

RENNOSUKE KONDO, OF TOKYO, JAPAN.

DEVICE FOR PREVENTION OF DETONATION IN INTERNAL-COMBUSTION ENGINES.

Application filed April 3, 1928, Serial No. 266,988, and in Japan December 27, 1927.

The present invention relates to a device for prevention of detonation in internal combustion engines, consisting of a small passage directly connected with the combustion chamber and also communicating with an expansion chamber through a small orifice and having an igniting device at its middle portion so as to make the pressure in the neighbourhood of the igniting device lower than that in the combustion chamber and to accomplish the ignition while the fuel gas is moving. The object of the present invention is to prevent the occurrence of detonation even in large compression ratio of the mixture and thus to increase the efficiency of a light oil engine.

The accompanying drawing shows a longitudinal sectional elevation of the combustion chamber of this invention and illustrates an example of carrying it into practice.

In the light oil engine it is necessary to compress the mixture before the commencement of the explosion-stroke, and the higher the compression ratio is the higher the efficiency of the engine becomes. However if the compression ratio reaches a certain value according to the properties of fuel, detonation will occur, so that the higher compression can not be obtained. This is one of the reasons why internal combustion engines of to-day are used with comparatively poor efficiency.

According to the present invention, even if the mixture is highly compressed, a comparatively low pressure part is formed in the neighbourhood of the igniting device and the mixture is ignited while it is moving. Therefore, the occurrence of detonation can be prevented and consequently the efficiency of the engine is increased.

Referring to the accompanying drawing, (1) is a combustion chamber which is connected with an expansion chamber (3) through a small passage (2). The said expansion chamber (3) and the small passage (2) communicate with each other through a small orifice (4). An ignition plug (5) is in the said small passage (2). The expansion chamber (3) is provided with an automatic valve (6) to be open inwardly by suction.

In the above device, the mixture compressed in the combustion chamber by a piston flows into the expansion chamber (3) from the orifice (4) after passing the small passage (2), and as it takes considerable time for the pressure in the said expansion chamber to become equal to that in the combustion chamber, on account of the narrow passage between both chambers, the pressure in the said expansion chamber is far lower than that in the combustion chamber during the compression stroke and therefore the pressure in the small passage of a reduced cross sectional area between both chambers is kept lower than that in the combustion chamber. Ignition by the ignition plug (5) does not only occur in this part of comparatively low pressure, but the mixture in the combustion chamber continues its motion into the expansion chamber through the small passage (2) due to the difference of the pressure even after the compression stroke, is completed. That is to say, as the mixture in the small passage touches the ignition plug while it is flowing, the same part of the mixture does not stay in contact with the sparking point of the plug where the temperature is the highest in the combustion chamber, thus preventing the slow combustion of the mixture caused by a high temperature.

The action described above puts in a moderate condition the three elements, viz, the duration of the staying of the mixture under a high temperature, heat and pressure which are usually the causes of the detonation, and mitigates the occurrence of the said phenomenon in low rotating speed. When the rotating speed of the engine is increased, the duration of the flow of the mixture into the expansion chamber through the small orifice is shortened and the quantity of inflow will be decreased. In the limiting case the mixture is compressed merely in the combustion chamber as if there exists no expansion chamber. Therefore, in such a case the pressure in the neighbourhood of the igniting device becomes higher than in low rotating speed, but generally detonation seldom occurs in high rotating speed, so the occurrence of detonation can be retarded in spite of an increase in the compression ratio for all speeds of rotation by the adoption of a suitable dimension for the small orifice (4) and the choice of a proper ratio of volumes of the expansion and combustion chambers.

Hitherto, anti-detonating liquids or gases have often been injected into the combustion chambers together with the mixtures as the means to prevent the occurrence of detonation. In this invention, when it is required to use such a fluid, the pipe for supplying it is, connected with the automatic valve (6) in the expansion chamber, and then the fluid will July 2, 1929.　　　　J. KRANS　　　　1,719,706
STEEL WORKER'S SAFETY DEVICE AND GLASSES
Filed Dec. 15, 1928　　　2 Sheets-Sheet 1